Jan. 31, 1956
H. W. BABCOCK
2,733,006
ROCKET SIGHT FOR AIRCRAFT
Filed Aug. 23, 1949
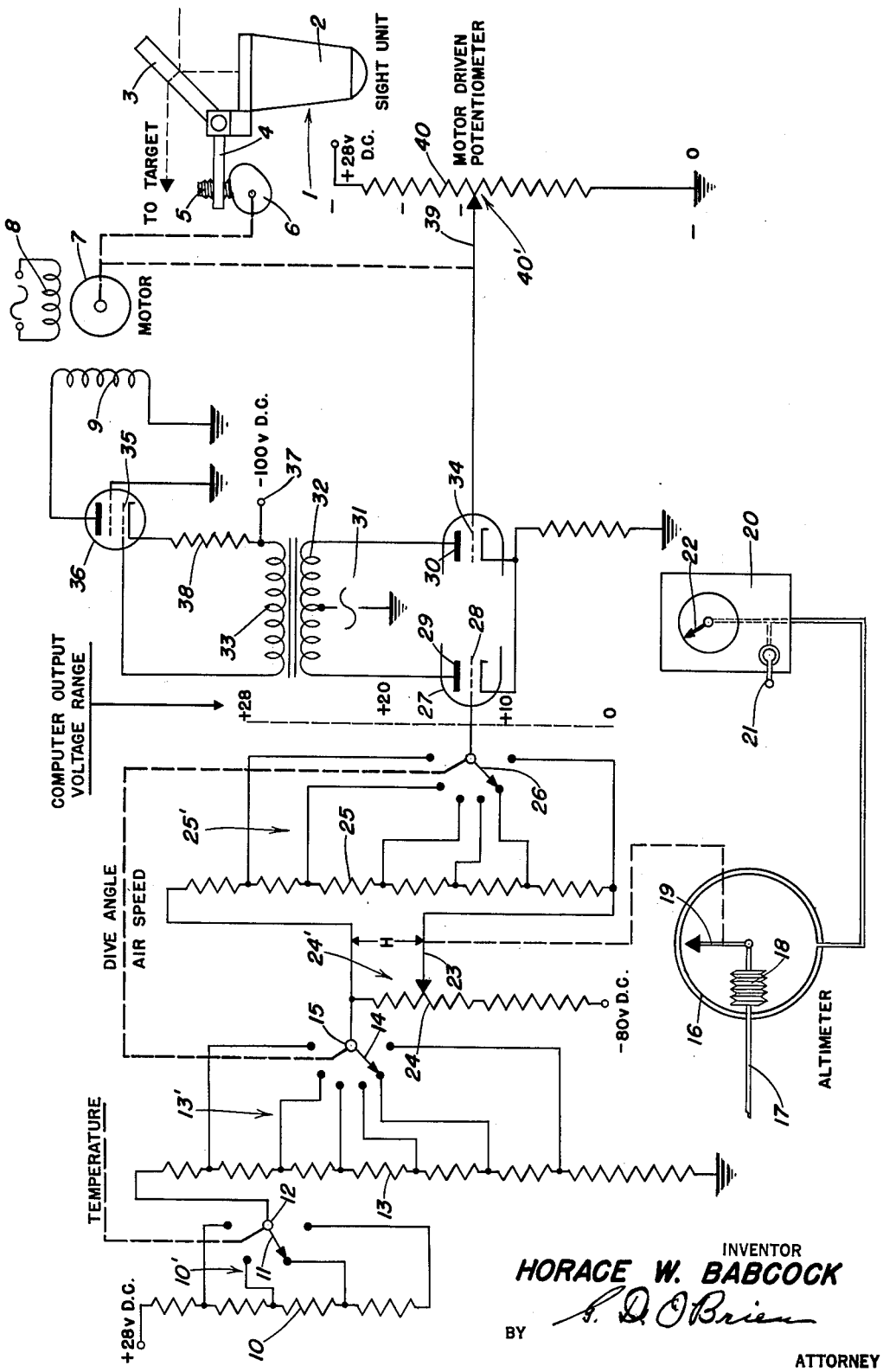
INVENTOR
HORACE W. BABCOCK
BY
ATTORNEY

United States Patent Office 2,733,006
Patented Jan. 31, 1956

2,733,006
ROCKET SIGHT FOR AIRCRAFT

Horace W. Babcock, Pasadena, Calif., assignor to the United States of America as represented by the Secretary of the Navy Application August 23, 1949, Serial No. 111,920

3 Claims. (Cl. 235—61.5)

This invention relates to a computing sight for aircraft, designed for the firing of aircraft rockets at ground or surface targets. The operation of the sight is automatic to relieve the pilot of the task of range estimation when firing aircraft rockets. Aircraft altitude is introduced automatically into the sight from a barometric altimeter while dive angle, aircraft speed, rocket propellant temperature and altitude of target are selected manually.

The data introduced into the sight are converted by electrical multiplication and addition into a voltage that is proportional to the desired sight angle. This voltage is then used to control a small motor in the rocket sight which tilts the reticle reflection plate, through which the pilot looks at the target, to the desired sight angle. Throughout the rocket attack, as the altitude decreases, the sight angle is continuously adjusted, and the pilot can put the pip of the sight on the target and fire at any range within the effective range of the rockets.

From the theory of forward-firing aircraft rockets it is known that for zero-length launchers mounted parallel to the boresight datum line, the sight angle, S, is given by the following expression:

$$S = \text{trajectory drop} + f \times \text{angle of attack of datum line } (\alpha)$$

The sight angle is the elevation of the boresight datum line above the line of sight to the target. By "trajectory drop" is meant the angle in mils between the rocket at any range and its effective launching line, as viewed from the firing point. The symbol "$f$" is the factor by which the rocket turns into the wind and $\alpha$ represents the dive angle. By using the ballistic data for various rockets, it can be shown that, to a good approximation, the sight angle may be expressed as follows:

$$S = f \times \text{angle of attack of datum line} + a + bR$$

It can be further shown by empirical fitting that this expression may be changed to the form $$S = A + BH$$

where A is a function of aircraft speed, dive angle and propellant temperature, while B is a function of speed and dive angle, with negligible dependence upon temperature. H is the altitude of the aircraft above the target.

By presetting the values of aircraft speed, dive angle and propellant temperature in the sight unit, these factors become constants in the equation and H is the only variable remaining.

An object of the invention is to provide a rocket sight for aircraft in which the sight angle is automatically calculated for any target range.

A further object is to provide a sight which is corrected for the ballistic factors which affect the flight of rockets fired from aircraft.

A still further object of the invention is to obtain a sight in which the ballistic factors affecting rocket flight under a number of attack conditions can be preset in the sight unit so that the correct sight angle can be obtained when any selected attack condition is maintained.

A still further object is to provide a sight which is automatically corrected for target range by the use of an altimeter which constantly produces a signal proportional to range.

With these and other objects in view, as will hereinafter more fully appear, and which will be more particularly pointed out in the appended claims, reference is now made to the following description taken in connection with the accompanying drawing in which the view is a diagram of the rocket sight including the circuit for the sight unit and altimeter.

Referring to the foregoing view, the sight unit 1 has a housing 2 containing a standard lamp, reticle and lens arrangement (not shown) for projecting the image of the reticle upward for reflection from the tilting reflector plate 3. Arm 4 is fixed to plate 3 and carries a follower 5 which rides upon cam 6. Rotation of cam 6 will adjust the angle between the line of sight through the plate 3 and the boresight datum line of the aircraft. A small two-phase, low-inertia motor 7, having a fixed phase winding 8 and a variable phase winding 9, is used to position cam 6 to obtain the correct sight angle. The current and the phase of the current received by the variable phase winding 9 of motor 7 is a function of the various factors which affect rocket flight, such as propellant temperature, dive angle, air speed and altitude.

A first potentiometer 10' has a winding 10 supplied with 28 volts D. C. and is utilized to provide a correction for propellant temperature. Four different voltage contacts corresponding to four different temperatures are available through the manual adjustment of potentiometer arm 11 by knob 12. For example, the voltages obtainable from the four contacts can be functions of 0, 40, 70 and 100 degrees of propellant temperature.

A second potentiometer 13' has a winding 13, connected between arm 11 and ground, and is provided with six contact points for potentiometer arm 14. By knob 15, the pilot can manually select one of three diving angles for an attack and has a choice of two speeds for any diving angle selected. The potential picked off potentiometer winding 13 by arm 14 is therefore a function of propellant temperature, dive angle and air speed. The potential at arm 11 is reduced by the potential drop in winding 13 so that the potential available at arm 14 becomes a constant proportional to the value of A in the sight angle equation.

A standard altimeter unit 16, mounted in the aircraft, is utilized to obtain constant correction of the sight angle for aircraft altitude. The altimeter has a static pressure line 17 for supplying atmospheric pressure to a bellows 18, which operates the altimeter indicator hand 19. The altitude measurement desired is the difference in altitude between the aircraft and the target. Consequently, it is necessary to adjust the zero reading of the altimeter to correspond to the target altitude. This is accomplished by the target altitude control 20. The crank 21 is directly connected to pointer 22 and to the altimeter unit 16. When the crank 20 is rotated to set pointer 21 to target altitude, the altimeter unit is also rotated in its case to adjust the position of hand 19 relative to its scale and thereby adjust the reading of hand 19 for target altitude.

The indicator hand 19 is directly connected, through any type of low inertia connection, to an arm 23 of a third potentiometer 24' which has a winding 24. The winding 24 is connected at one terminal to arm 14 and at the other terminal to a —80 volts D. C. source. Any change in altitude of the aircraft causes movement of hand 19 and a corresponding movement of arm 23 over winding 24 to vary the potential at arm 23 in accordance with aircraft altitude.

Connected across winding 24, between arm 14 and arm 23, is a fourth potentiometer 25' for modifying the voltage taken off winding 24 in accordance with dive angle and air speed. This fourth potentiometer 25' is similar to the second potentiometer 13' and has six contact points. The fourth potentiometer consists of winding 25 and contact arm 26 and the position of arm 26 follows that of arm 14 since the two arms are directly connected.

As has been pointed out, potentiometers 10' and 13' give a potential on arm 14 proportional to the constant A in the sight angle equation. The potential of arm 14 is further reduced by the potential drop in winding 24 which is a function of altitude H. This potential drop is divided in potentiometer 25' by a factor proportional to dive angle and air speed. The potentiometers 24' and 25' therefore reduce the voltage of arm 14 by the factor BH in the sight angle equation. Through the use of the four potentiometers, it is now possible to electrically solve the equation $S=A+BH$ for the sight angle corresponding to any given altitude. The voltage at arm 26 is therefore proportional to the sight angle S since it is proportional to the factor $A+BH$. The voltages theoretically available at arm 26 range between $+28$ and 0 volts D. C.

In order to continuously adjust the sight angle of reticle plate 3 in accordance with changes in altitude of the aircraft, the voltage at arm 26 is applied to the grid 28 of double triode tube 27. The plates 29 and 30 of the tube 27 are connected to the primary 32 of an interstage transformer which is center tapped to a 400 cycle A. C. source 31. As long as the voltages on grids 28 and 34 are equal, equal currents will flow in each half of the tube and in each half of the primary winding 32, with the result that the voltages induced in secondary winding 33 of the transformer will cancel out and no alternating voltage will be applied to grid 35 of power amplifier tube 36.

The voltage applied to grid 34 is controlled by the sight positioning motor 7 as will be presently described. Whenever a difference in voltage exists between grids 28 and 34, an alternating voltage of either leading or lagging quadrature phase will result in the secondary winding 33 due to the fact that one side of tube 27 will pass more current than the other. This alternating voltage will be impressed upon grid 35 of tube 36 and will cause alternating current to flow in the variable phase winding 9 of the motor 7. With the anode grounded, a $-100$ v. D. C. source 37 is connected to the cathode of tube 36 through resistance 38.

Directly coupled to cam 6 is an arm 39 which is positioned on potentiometer winding 40 by the motor. The voltages available from the potentiometer 40' range between $+28$ volts D. C. and zero voltage. Arm 39 is connected to grid 34 of tube 27 to provide a follow-up for motor 6. It is readily apparent that as the position of arm 23 is varied in accordance with aircraft altitude, the voltage on grid 28 will vary and thereby cause alternating current to flow in secondary winding 33 and in winding 9. This will result in rotation of motor 7 and movement of arm 39 to a position at which the voltage applied to grid 34 will equal the voltage on grid 28. When this occurs, motor 7 will cease rotating since both sides of the tube 27 will be passing equal amounts of current. The rotation of motor 7 will also adjust the position of cam 6 and reticle plate 3 so that the sight angle will change with aircraft altitude. The phase of the voltage in secondary winding 33 reverses when the direction of unbalance in the tube changes and motor 7 is thus caused to run in a direction determined by the relative voltage unbalance of the grids.

The operation of the rocket sight will now be described. Before starting the rocket attack, the pilot will manually set the approximate propellant temperature on potentiometer 10'. Also, the dive angle and air speed will be manually set on potentiometers 13' and 24'. As an example, the pilot can select a 20° dive at 280 or 320 miles per hour, a 30° dive at 300 or 340 miles per hour or a 40° dive at 320 or 350 miles per hour. To adapt the rocket sight for firing more than one size of rocket, additional sets of potentiometers can be supplied which give the required corrections for each type of rocket fired.

In order to obtain the proper correction for altitude, the pilot will adjust the reading of pointer 19 to target altitude so that the position of arm 23 will be a function of the difference between target and aircraft altitude. The position of the arm will change along with the aircraft altitude during the attack as will the voltage on grid 28. The magnitude of the voltage on grid 28 controls the position of motor 7 so that the sight angle on the rocket sight will be constantly corrected. After the pilot has made the required settings, it is only necessary that the pilot keep the sight on the target in order to aim the rockets in the proper direction for hitting the target.

It is within the scope of this invention to include the adjustment of other equipment in accordance with known constants and one or more variables. Potentiometers can be used to solve many types of equations having factors varying with temperature, light intensity and the like. The novel follow-up means disclosed provides a way of converting the electrical signal, representing the solution desired, into mechanical power for adjustment purposes.

What is claimed is:

1. In combination in a fire control sight, a movable sighting member, a motor coupled to drive said member, and a computer; said motor being of the two-phase type with a fixed winding and a reversing winding, a power source of alternating current of two quadrature phases, a circuit for applying alternating current of one phase to said fixed winding, and a circuit for applying alternating current of quadrature phase to said reversing winding, circuitry for selectively reversing the phase of the current in said reversing winding, said circuitry including a transformer with a secondary winding and a center-tapped primary winding, two grid control tubes, the anode-cathode paths of said tubes being connected in series with the terminals, respectively, of said primary winding, the quadrature phase of said source being connected in parallel with the two halves of said primary winding through the center tap; a potentiometer, a steady direct current source connected across said potentiometer and said potentiometer having a sliding contact mechanically coupled to said movable sighting member so that incremental movements of said member is followed by corresponding movements of said contact; said computer comprising means for combining a plurality of voltages proportional, respectively, to factors to be mathematically combined and for producing a resultant variable voltage, the variable voltage output of the computer being directly connected to the grid of one of said tubes, and the sliding contact being directly connected with the grid of the other tube so that the potential of the sliding contact may be directly compared with the variable voltage.

2. In combination, a movable member, a motor coupled to drive said member, said motor being of the polyphase type with a reversing winding; a power source of alternating current, a circuit for applying the alternating current to said reversing winding and for reversing the time phase of the alternating current, said circuit including a transformer with a secondary winding and a center tapped primary winding, two grid-controlled tubes, the anode-cathode paths of said tubes being connected in series with the terminals, respectively, of said primary winding, said source being connected in parallel with the two halves of said primary winding through the center tap; a potentiometer, a steady direct current source connected across said potentiometer, said potentiometer having a sliding contact mechanically coupled to said movable member so that incremental movements of said member is followed by corresponding movements of said sliding contact, a source of variable potential, the variable source being directly connected to the grid of one tube, and the sliding contact being directly connected to the grid of the other tube so that the potential of the sliding contact may be directly compared with the variable potential.

3. In the combination defined in claim 2, said source of variable potential comprising computer means for combining a plurality of voltages into a single resultant variable voltage, said plurality of voltages being proportional, respectively, to a plurality of range determining factors.

References Cited in the file of this patent

UNITED STATES PATENTS

| | | |
|---|---|---|
| 2,266,064 | Muller | Dec. 16, 1941 |
| 2,352,953 | Haight | July 4, 1944 |
| 2,399,726 | Doyle | May 7, 1946 |
| 2,426,711 | Shaffer | Sept. 2, 1947 |
| 2,446,563 | Upton | Aug. 10, 1948 |
| 2,466,879 | Doba | Apr. 12, 1949 |
| 2,471,422 | Frost | May 31, 1949 |
| 2,488,448 | Townes | Nov. 15, 1949 |
| 2,525,466 | Wald | Oct. 10, 1950 |